United States Patent [19]
Mannava et al.

[11] Patent Number: 6,155,789
[45] Date of Patent: Dec. 5, 2000

[54] GAS TURBINE ENGINE AIRFOIL DAMPER AND METHOD FOR PRODUCTION

[75] Inventors: Seetharamaiah Mannava, Cincinnati; William D. Cowie, Xenia, both of Ohio; Robert L. Yeaton, Hampstead, N.C.

[73] Assignee: General Electric Company, Cincinnati, Ohio

[21] Appl. No.: 09/286,803

[22] Filed: Apr. 6, 1999

[51] Int. Cl.[7] ........................................ B63H 1/26
[52] U.S. Cl. ............... 416/241 R; 416/500; 416/230; 416/229 A; 416/236 R; 415/119; 29/889.7; 29/889.1
[58] Field of Search ................... 416/500, 230, 416/229 A, 236 R, 241 R; 415/119; 29/889.7, 889.1

[56] References Cited

U.S. PATENT DOCUMENTS

| | | |
|---|---|---|
| 3,834,833 | 9/1974 | Faber et al. . |
| 3,850,698 | 11/1974 | Mallozzi et al. . |
| 4,002,403 | 1/1977 | Mallozzi et al. . |
| 4,060,769 | 11/1977 | Mallozzi et al. . |
| 4,118,147 | 10/1978 | Ellis . |
| 4,401,477 | 8/1983 | Clauer et al. . |
| 4,426,867 | 1/1984 | Neal et al. . |
| 4,539,461 | 9/1985 | Benedict et al. . |
| 4,937,421 | 6/1990 | Ortiz, Jr. et al. . |
| 5,131,957 | 7/1992 | Epstein et al. . |
| 5,232,344 | 8/1993 | El-Aini . |
| 5,306,360 | 4/1994 | Bharti et al. . |
| 5,409,415 | 4/1995 | Kawanami et al. . |
| 5,492,447 | 2/1996 | Mannava et al. . |
| 5,498,137 | 3/1996 | El-Aini et al. . |
| 5,531,570 | 7/1996 | Mannava et al. . |
| 5,584,662 | 12/1996 | Mannava et al. ............... 416/241 R |
| 5,591,009 | 1/1997 | Mannava et al. . |
| 5,674,328 | 10/1997 | Mannava et al. . |
| 5,674,329 | 10/1997 | Mannava et al. . |
| 5,756,965 | 5/1998 | Mannava . |
| 6,004,102 | 12/1999 | Kuefner et al. ............... 416/236 R |

OTHER PUBLICATIONS

"Laser shocking extends fatigue life", by John A. Vaccari, American Machinist, Jul., 1992, pp. 62–64.

"Laser Shock Processing Increases the Fatigue Life of Metal Parts", Materials and Processing Report, Sep. 1991, pp. 3–5.

*Primary Examiner*—Edward K. Look
*Assistant Examiner*—Hermes Rodriguez
*Attorney, Agent, or Firm*—Andrew C. Hess; Gerry S. Gressel

[57] ABSTRACT

A gas turbine engine airfoil assembly for damping airfoil vibrations includes a metallic airfoil having an outer surface and a chordwise extending cavity beneath the outer surface of the airfoil. A damper is trapped within the cavity and a region in the airfoil surrounding the cavity has compressive residual stresses imparted by laser shock peening. The damper is preferably a chordwise extending linear wire having a distal end tacked down within the cavity. The invention includes a method for constructing the assembly for damping airfoil vibrations.

16 Claims, 2 Drawing Sheets

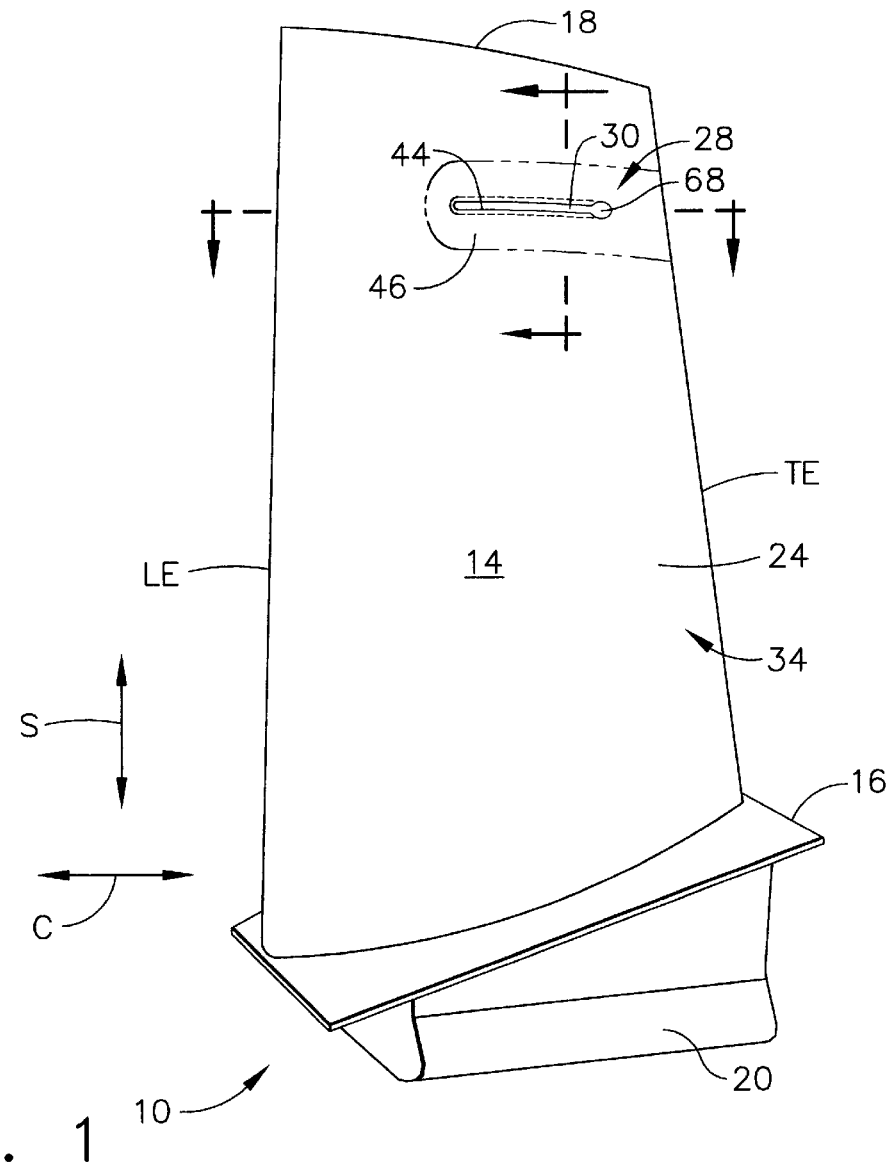
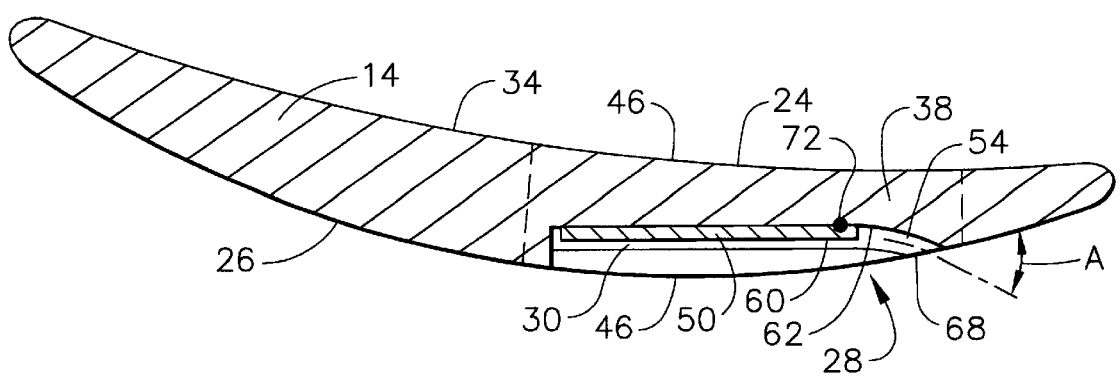

GAS TURBINE ENGINE AIRFOIL DAMPER AND METHOD FOR PRODUCTION

BACKGROUND OF THE INVENTION

1. Field of the Invention

The invention relates to gas turbine engine fan and compressor blades and vanes and, more particularly, to vibration dampers for the airfoils of the blades and vanes.

2. Description of Related Art

Modern aircraft gas turbine engine fan and compressor blades having low aspect ratio airfoils are often subject to high stage loading and may experience chordwise vibration at lower frequencies. The problem is exasperated in the case of wide chord and twisted fan blades which tend to be wider at the tip and more narrow at the hub or base of the blase's airfoil. The potential for resonance crossings occurring at high engine speeds and consequently high energy increases and can cause significant high cycle fatigue problems. These can result in liberation of portions of the airfoil.

Stripe mode resonance can present a significant problem in the design and development of gas turbine engine fan and compressor blades. Stripe mode resonance is a plate deformation vibratory mode, a high frequency resonance phenomenon associated with the aerodynamic wakes generated by rows of airfoils upstream of the blade row experiencing the stripe mode excitation. It is very local in both stress and deformation, being located primarily in a radially outward tip portion of the blade which undergoes predominantly chordwise bending. In contrast, low frequency modes of flexure and torsion extend over a large portion of the blade and produce significant stresses in a radially inward portion of the airfoil.

Higher order modes of vibration are more difficult to damp. Upstream airfoils within a multiple stage rotor assembly, for example, can create aerodynamic wakes that cause downstream airfoils to experience higher order modes of vibration. This vibration can result in chordwise bending, particularly, in radially outer portions of the airfoil in a non-symmetrical pattern and is accordingly difficult to predict in terms of magnitude and position.

What is needed, therefore, is an apparatus and/or a method for damping higher order modes of vibration in a blade of a rotor assembly. U.S. Pat. No. 5,498,137 discloses an airfoil with a recess in the form of a pocket formed in a chordwise surface. A damper is received within the pocket between an inner surface of the pocket and a pocket lid attached to the airfoil by conventional attachment apparatus and contoured to match the curvature of the airfoil. Frictional wear is a concern that is overcome by biasing the damper. One problem due to such a design is the stress concentration, often referred to as Kt, around the recess or pocket. The recess or pocket serves as a stress concentrator which reduces the useful life of the blade. Another problem of such designs is fretting which is a distinguished from wear. Fretting due to the damper vibrating against friction producing surfaces causes tiny cracks to form in these surfaces. This in and of itself is not a serious problem but when the cracks begin to propagate, the resultant crack growth can cause failure of a portion of the blade and/or reduce its useful life.

Therefore, it is highly desirable to provide an easily manufactured damping apparatus for the airfoils of such blades which will also overcome wear and fretting problems due to friction which such dampers utilize to damp vibration of blades. It is also highly desirable to provide a damping apparatus which doesn't significantly reduce the life of the airfoil. It is also desirable to manufacture a blade with a recess and a damper received therein which is less prone to failure due to stress concentration around the recess.

SUMMARY OF THE INVENTION

The present invention includes a gas turbine engine airfoil assembly for damping airfoil vibrations and method for making the assembly. The airfoil assembly includes a metallic airfoil having an outer surface and a chordwise extending cavity beneath the outer surface of the airfoil. A damper is trapped within the cavity and a region in the airfoil surrounding the cavity has compressive residual stresses imparted by laser shock peening. The damper is preferably a chordwise extending linear wire having a distal end tacked down within the cavity.

ADVANTAGES OF THE INVENTION

An advantage of the present invention is its ability to damp higher order modes of vibration in an airfoil with a minimal disturbance of air flow around the airfoil, a minimal effect on the airfoil's performance, and a minimal affect on the structural integrity of the airfoil. The airfoil damping apparatus of the present invention can be easily and inexpensively installed on both new airfoils and old airfoils.

Another advantage of the present invention is its ability to reduce stress concentration around recesses such as pockets in airfoils within which dampers are placed and reduce fretting due to the dampers operation within the pocket. The useful life of the airfoil with the damper in the recess is increased because of reduced fretting and reduced stress concentration around the recesses. The present invention also counters tiny cracks which form in friction producing surfaces around the recesses due to the damper vibrating against these surfaces and slows down their progression to larger airfoil failing cracks.

BRIEF DESCRIPTION OF THE DRAWINGS

The foregoing aspects and other features of the invention are explained in the following description, taken in connection with the accompanying drawings where:

FIG. 1 is a perspective view illustration of a gas turbine engine blade having an airfoil with a damper apparatus;

FIG. 2 is a chordwise cross-sectional view of the airfoil and the damping apparatus through line 2—2 in FIG. 1;

DETAILED DESCRIPTION OF THE INVENTION

Figure 3:
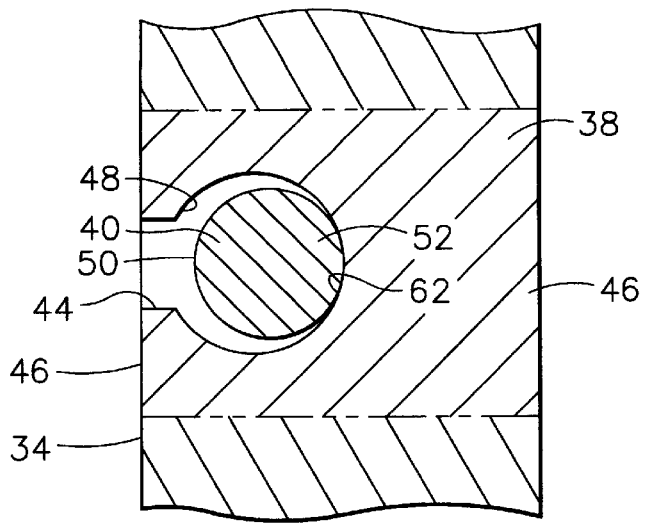
FIG. 3 is a spanwise cross-sectional view through line 3—3 of the damping apparatus in FIG. 2.

Illustrated in FIG. 1 is a gas turbine engine blade 10, such as a fan or compressor blade. The blade 10 includes an airfoil 14 extending radially outward, in a spanwise direction S, from a blade platform 16 to a blade tip 18. The fan blade 10 includes a root section 20 extending radially inward from the platform 16. The airfoil 14 extends in a chordwise direction C between a leading edge LE and a trailing edge TE of the airfoil 14. The airfoil 14 has a pressure side 24 and a suction side 26. Referring further to FIG. 2, a damping apparatus 28 for damping vibrations in the blade 10 includes a chordwise extending cavity 30 beneath an outer surface 34 of the airfoil 14 and preferably on the suction side 26.

Figure 4:
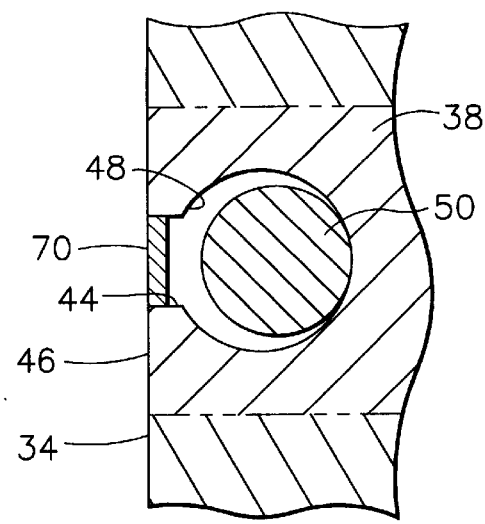
FIG. 4 illustrates the damping apparatus in FIG. 3 with a sealed slot.
Figure 5:
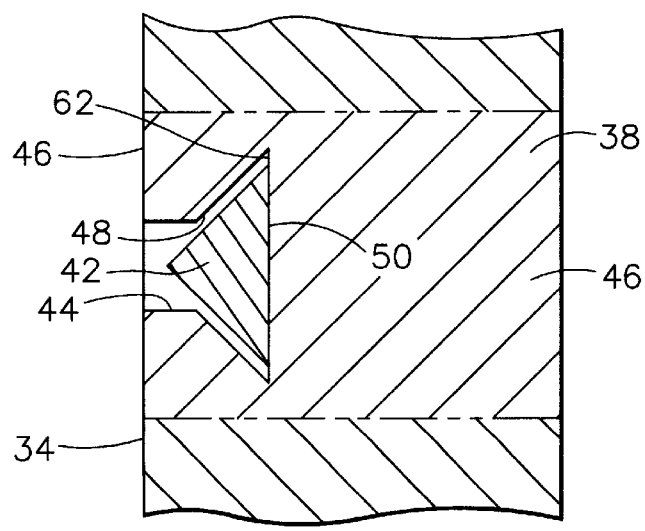
FIG. 5 is a spanwise cross-sectional view of an alternative embodiment of the damping apparatus in FIG. 3.

A drilling or machining process employing a cutting tool with a shaped head is used to form the cavity 30 with a shaped cross-section such as the circular cross-section 40 in FIG. 3 or the triangular cross-section 42 in FIG. 4. This also forms a chordwise extending slot 44 to the cavity 30 through the airfoil 14 along a length of the cavity and undercut edges 48 of the cavity along the slot. A wire damper 50, preferably having a cross-sectional shape 52 corresponding to the cross-section of the cavity 30, is disposed within the cavity. Other types of dampers may be used. The machining process also is used to form an entranceway 54 to the cavity 30 and has the same cross-sectional shape as the cavity 30 to which it is connected. The entranceway 54 is preferably formed during the same procedure as the cavity 30 and is inclined with respect to the outer surface 34 along the suction side 26 of the airfoil 14 as indicated by an incline angle A. The entranceway 54 has an opening 68 in the airfoil 14 through which the wire damper 50 is inserted into the cavity 30. Preferably, a distal end 60 of the wire damper 50 is secured within the cavity 30 by a tack weld 72 or some other attachment means to an inner wall 62 of the cavity 30.

Figure 6:
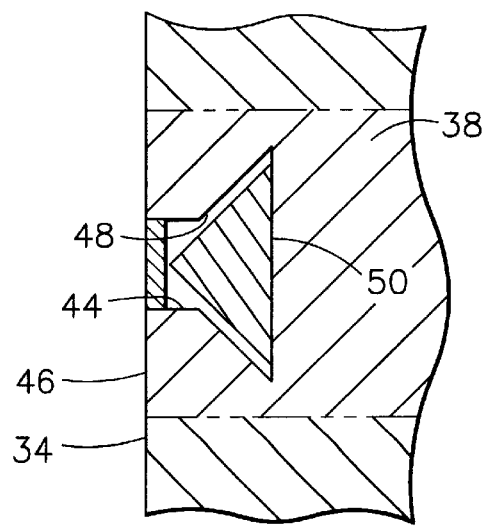
FIG. 6 illustrates the damping apparatus in FIG. 5 with a sealed slot.

A region 38 surrounding the cavity 30 in the airfoil 14 has compressive residual stresses imparted by laser shock peening. The region 38 is preferably formed by simultaneously laser shock peening the pressure and suction sides 24 and 26 along laser shock peening surfaces 46 from which the region extends into the airfoil 14. The laser shock peening may be done before or after the insertion of the wire damper 50. Alternative embodiments, illustrated in FIGS. 4 and 6, include a seal 70 in the slot 44 wherein the seal extends inward from the outer surface 34 of the airfoil 14.

Laser shock peening is a process for producing a region of deep compressive residual stresses. Laser shock peening typically uses multiple radiation pulses from high power pulsed lasers to produce shock waves on the surface of a workpiece similar to methods disclosed in U.S. Pat. No. 3,850,698, entitled "Altering Material Properties"; U.S. Pat. No. 4,401,477, entitled "Laser Shock Processing"; and U.S. Pat. No. 5,131,957, entitled "Material Properties". Laser shock peening, as understood in the art and as used herein, means utilizing a laser beam from a laser beam source to produce a strong localized compressive force on a portion of a surface by producing an explosive force by instantaneous ablation or vaporization of a painted or coated or uncoated surface. Laser peening has been utilized to create a compressively stressed protection layer at the outer surface of a workpiece which is known to considerably increase the resistance of the workpiece to fatigue failure as disclosed in U.S. Pat. No. 4,937,421, entitled "Laser Peening System and Method". These methods typically employ a curtain of water flowed over the workpiece or some other method to provide a confining medium to confine and redirect the process generated shock waves into the bulk of the material of a component being LSP'D to create the beneficial compressive residual stresses.

Laser shock peening is being developed for many applications in the gas turbine engine field, some of which are disclosed in the following U.S. Pat. Nos. 5,591,009, entitled "Laser shock peened gas turbine engine fan blade edges"; 5,492,447, entitled "Laser shock peened rotor components for turbomachinery"; 5,674,329, entitled "Adhesive tape covered laser shock peening"; and 5,756,965, entitled "On the fly laser shock peening" as well as others.

The present invention includes a method of forming the gas turbine engine damped airfoil assembly with the following steps:

(A) forming the chordwise extending cavity beneath the outer surface of the metallic airfoil;

(B) forming a laser shock peened region in the airfoil surrounding the cavity, the region having compressive residual stresses imparted by laser shock peening;

(C) inserting a chordwise extending a damper within the cavity; and (D) securing the damper, such as by tacking it to the airfoil at the bottom of the cavity, so it cannot move in a chordwise direction within the cavity.

The method preferably includes forming the slot with the cavity by machining with a cutting tool having a shaped head conforming to the cross sectional shape of the chordwise extending cavity. Forming the slot and cavity in the chordwise direction also forms the undercut slot edges that trap the damper and the laser shock peened region includes the slot edges. The entranceway connected to the cavity is preferably also formed by moving the cutting tool into the airfoil at an incline with respect to the outer surface and forming the opening in the airfoil through the outer surface upon initial cutting of the outer surface. The cavity and the laser shock peened region are preferably formed on the suction side of the airfoil. This hides and protects the damping apparatus 28 from the harsher environment and airflow, including debris, encountered by the pressure side of the airfoil. This can preclude the need for the seal in the slot.

While the preferred embodiment of the present invention has been described fully in order to explain its principles, it is understood that various modifications or alterations may be made to the preferred embodiment without departing from the scope of the invention as set forth in the appended claims.

We claim:

1. A gas turbine engine airfoil assembly, comprising:
a metallic airfoil having an outer surface,
a chordwise extending cavity beneath the outer surface of said airfoil;
a damper trapped within said cavity; and
a region in said airfoil surrounding said cavity, said region having compressive residual stresses imparted by laser shock peening.

2. An assembly as claimed in claim 1 wherein said damper is a chordwise extending linear wire.

3. An assembly as claimed in claim 2 wherein said wire includes a distal end tacked down within said cavity.

4. An assembly as claimed in claim 3 further comprising an entranceway connected to said cavity, inclined with respect to said outer surface, and having an opening in said airfoil through said outer surface.

5. An assembly as claimed in claim 3 wherein said wire and a portion of said cavity within which said damper is trapped are circular in cross-section.

6. An assembly as claimed in claim 5 further comprising a chordwise extending slot to said cavity through said airfoil along a length of said cavity and undercut edges of said cavity disposed along said slot that trap said damper.

7. An assembly as claimed in claim 3 wherein said wire and a portion of said cavity within which said damper is trapped are triangular in cross-section.

8. An assembly as claimed in claim 7 further comprising a chordwise extending slot to said cavity through said airfoil along a length of said cavity and undercut edges of said cavity disposed along said slot and that trap said damper.

9. A gas turbine engine airfoil assembly, comprising:

a metallic airfoil having an outer surface, a cavity extending in a chordwise direction beneath the outer surface of said wall;

a damper trapped within said cavity;

a slot through said airfoil extending inward to and along said cavity in said chordwise direction forming undercut slot edges that trap said damper; and a laser shock peened region in said airfoil surrounding said cavity and including said slot edges, said region having compressive residual stresses imparted by laser shock peening.

10. An assembly as claimed in claim 9 further comprising an entranceway connected to said cavity, inclined with respect to said outer surface, and having an opening in said airfoil through said outer surface.

11. An assembly as claimed in claim 10 wherein said cavity is disposed on a suction side of said airfoil.

12. An assembly as claimed in claim 10 further comprising a seal in said slot, said seal extending inward from said outer surface of said wall.

13. A method of constructing a gas turbine engine damped airfoil assembly, comprising the following steps:

a) forming a chordwise extending cavity beneath an outer surface of a metallic airfoil, b) forming a laser shock peened region in said airfoil surrounding said cavity, said region having compressive residual stresses imparted by laser shock peening, c) inserting a chordwise extending a damper within the cavity; and d) securing the damper so it cannot move in a chordwise direction within the cavity.

14. A method assembly as claimed in claim 13 wherein said forming the cavity includes forming a slot through the airfoil extending inward to and along the cavity in the chordwise direction forming undercut slot edges that trap the damper and the laser shock peened region includes the slot edges.

15. A method assembly as claimed in claim 14 wherein said forming the cavity includes forming an entranceway connected to the cavity, inclined with respect to the outer surface, and having an opening in the airfoil through the outer surface.

16. A method assembly as claimed in claim 15 wherein the cavity and the laser shock peened region are formed on a suction side of the airfoil.

* * * * *